United States Patent [19]

Clarke

[11] 4,128,017
[45] Dec. 5, 1978

[54] VARIABLE SPEED DRIVE

[76] Inventor: George C. Clarke, 10509 Penfield Ave., Chatsworth, Calif. 91311

[21] Appl. No.: 791,373

[22] Filed: Apr. 27, 1977

[51] Int. Cl.² .................. F16H 55/52; F16H 7/10
[52] U.S. Cl. ................. 74/230.17 D; 74/242.15 R
[58] Field of Search ............. 74/230.17 D, 242.15 R

[56] References Cited

U.S. PATENT DOCUMENTS

| | | | |
|---|---|---|---|
| 3,470,757 | 10/1969 | Miley | 74/230.17 D |
| 3,583,535 | 6/1971 | Plamper | 192/11 |
| 3,628,390 | 12/1971 | Vanderlely et al. | 74/230.17 D X |
| 3,759,342 | 9/1973 | Plamper | 74/230.17 D X |
| 3,881,370 | 5/1975 | Vogelaar et al. | 74/230.17 D X |

Primary Examiner—Leonard H. Gerin
Attorney, Agent, or Firm—Jenkins, Coffey & Hyland

[57] ABSTRACT

A variable speed drive for a riding lawn mower or the like has a double pulley variable speed sheave assembly coupled between a driving pulley and a driven pulley by first and second V-belts, respectively. The sheave assembly is carried on a pivot arm pivotally mounted on a frame for the vehicle. A mechanical control linkage connected to the pivot arm is operable to shift the sheave assembly with respect to the driving and driven pulleys from a stopped position with both belts declutched through a range of low to high speed drive positions with the belts drivingly engaged. An idler pulley is carried on a spring lever assembly for engaging and variably tensioning one of the belts throughout said range of speed positions to place the belts under variable driving tension in accordance with operating speed.

33 Claims, 9 Drawing Figures

VARIABLE SPEED DRIVE

BACKGROUND OF THE INVENTION

This application is related in subject matter to my concurrently filed application Ser. No. 791,226, filed April 27, 1977, and Ser. No. 791,227, filed Apr. 27, 1977.

This invention relates to variable speed drives. More specifically, the invention relates to a variable speed drive system for use in small riding vehicles such as riding lawn mowers, garden tractors, and the like.

A wide variety of variable speed drives for small self-propelled vehicles are available throughout the prior art. Typically, such systems comprise a small driving motor such as a gasoline engine for rotating a driving pulley. The driving pulley is coupled by a V-belt to a driven pulley which imparts rotational motion to variable speed means such as a set of planetary gears. In operation, the vehicle operator adjust the gears to select a desired rate and direction of travel, and then drivingly engages the V-belts with the pulleys to drive the vehicle. See, for example, U.S. Pat. Nos. 3,789,684; 3,311,186; and 3,575,252.

Variable speed gear assemblies for use in riding lawn mowers and other small riding vehicles have not been totally satisfactory because of their relatively high cost. Further, conventional gear assemblies do not provide continuous speed variation over a wide range of low to high speeds without shifting gears. Moreover, gear drive systems have typically utilized a single V-belt which is subjected to large starting forces upon initial engagement with the pulleys. These large starting forces often cause the vehicle to dangerously buck and jerk. The existence of large starting forces also significantly shortens the operational life of the V-belt, and thereby requires frequent belt replacement.

Some variable speed drives have been proposed using a double pulley variable speed sheave for obtaining wide range speed variation. See, for example, U.S. Pat. Nos. 3,015,237; 3,457,797; 3,470,757; and 3,583,535. The variable speed sheave is mounted between a driving pulley and a driven pulley, with a second V-belt coupling the sheave with the driven pulley. The driven pulley in turn imparts rotational motion to the vehicle wheels via chains and sprocket wheels or the like. Speed variation is obtained by shifting the variable speed sheave with respect to the other pulleys to alter the sheave drive ratio. However, in such prior art systems, it is common practice to maintain one of the V-belts under driving tension at all times and to selectively engage and disengage the other V-belt for starting and stopping of the system. Thus, upon initial motion of the vehicle, one belt is required to absorb large starting forces. Accordingly, the dangerous bucking and jerking starts inherent with single belt drive systems have not been satisfactorily eliminated.

In recent years, safety has become an increasingly important criteria in the design of riding lawn mowers and the like. Accordingly, it is highly desirable to have drive assemblies such as gears, sprocket wheels, chains, etc. inaccessibly housed for safe vehicle operations. In this regard, prior art variable speed gear assemblies are advantageous in that they are typically enclosed within a gear box. On the other hand, chains and sprocket wheels used with variable speed sheaves are often mounted in an accessible location on the underside of the vehicle. See also U.S. Pat. Nos. 3,777,585 and 3,759,342. These exposed driving elements are inherently dangerous, and are frequently involved in severe consumer accidents.

It has also become desirable for riding lawn mowers and other small riding vehicles to include a so-called dead man control for automatically and immediately disabling the vehicle drive system in the event the operator falls off the vehicle or otherwise becomes unable to properly operate the vehicle. Generally, however, prior art riding vehicles have failed to utilize such dead man controls. Instead, prior art vehicles have used conventional clutch mechanisms which are normally biased for maintaining the drive system in an engaged, operating condition. Such clutch mechanisms require positive operator action to disable the drive system, and thereby cause the vehicle to continue operation in the event the operator falls off the vehicle.

Maintenance has also become an increasingly important aspect in the design of small vehicles such as riding lawn mowers. In particular, it is well known that V-belts used in belt drive systems tend to stretch during use. Eventually, the belts stretch to an extent whereby they no longer drivingly engage their respective pulleys. To this end, it is common practice to utilize springably biased pulley-carrying arms or springably biased idler pulleys for maintaining belts under driving tension. See, for example, U.S. Pat. Nos. 3,583,535; 3,015,237; 3,457,797; and 3,470,757. However, these mechanisms serve to maintain relatively constant tension on the belts regardless of belt stretching and regardless of belt velocity during operation. However, for maximum belt operating life, it is also desirable to adjust belt tension in accordance with operating speed while simultaneously adjusting for belt stretching. Specifically, some vehicles such as riding mowers require relatively high belt tension at high horsepower, high speed operating conditions, and relatively low belt tension at low horsepower, low speed operating conditions for optimum belt life. Other types of vehicles such as some recreational vehicles require relatively high belt tension at low speeds, and relatively low belt tension at high speeds. Prior art devices which account for belt stretching have failed to satisfactorily adjust belt tension over a range of operating speeds.

The variable speed drive of this invention provides an integrated drive system for a riding lawn mower or the like which overcomes the many problems and disadvantages of the prior art. Specifically, this invention provides a variable speed sheave assembly and driving belts in a variable speed drive which smoothly starts and drives a vehicle without significant bucking or jerking, and which provides speed variations over a continuous wide range. Moreover, this invention provides a variable speed drive which has substantially enclosed and concealed driving elements, which provides an effective dead man control, and which adjusts belt tension in accordance with operating speed.

SUMMARY OF THE INVENTION

In accordance with a preferred embodiment of the invention, a variable speed drive for a riding lawn mower or the like has a double pulley variable speed sheave assembly. The sheave assembly is coupled by a first V-belt to a motor-operated driving pulley and by a second V-belt to a driven pulley. The sheave assembly is carried on one end of a pivot arm which is pivotally connected to the frame of the vehicle. A mechanical control linkage is connected to the other end of the pivot arm, and is manually operable to shift the position of the sheave assembly with respect to the driving and driven pulleys to alter the sheave assembly drive ratio. Specifically, the control linkage is operable to move the sheave assembly between a stopped position with both belts drivingly disengaged and a range of low to high speed operating positions with both belts drivingly engaged. The control linkage is springably biased so that the sheave assembly is urged toward the stopped position whenever pressure on the control linkage is released by the vehicle operator.

A spring lever assembly is connected to the pivot arm, and carries an idler pulley for engaging one of the V-belts throughout the range of low to high speed operating conditions to place both belts under driving tension. More specifically, the spring lever assembly includes a spring for urging the idler pulley into engagement with one of the belts. The sheave assembly and the driving and driven pulleys are geometrically disposed such that the spring is minimally stretched when the sheave assembly is in a low speed operating condition to place the V-belts under a minimum driving tension. As the sheave assembly is shifted to high speed operating conditions, the spring stretches further to place the belts under progressively higher driving tension. This matches design criteria for optimum belt life under low horsepower, low speed conditions and high horsepower, high speed conditions.

The driven pulley is coupled to a transaxle assembly carried in a closed housing. The driven pulley drives in opposite directions a pair of bevel gears within the housing. One of said bevel gears is selectively coupled by the vehicle operator to a differential assembly which in turn is coupled to the wheels of the vehicle for selective driving of the vehicle in either a forward or a reverse direction.

BRIEF DESCRIPTION OF THE DRAWINGS

The accompanying drawings illustrate the invention. In such drawings.

DETAILED DESCRIPTION OF THE PREFERRED EMBODIMENT

Figure 1:
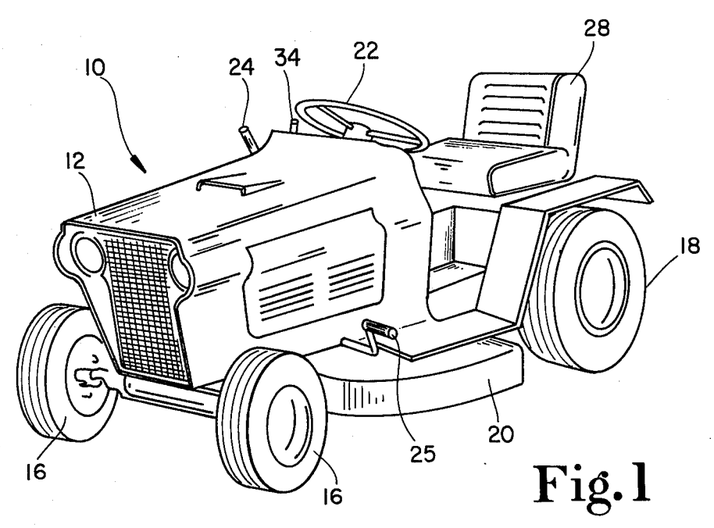
FIG. 1 is a perspective view of a riding lawn mower having a variable speed drive of this invention.

A riding lawn mower 10 is shown in FIG. 1, and generally comprises a molded shell body or hood 12 carried over a vehicle frame (not shown in FIG. 1). The frame supports a pair of front wheels 16 and a pair of rear wheels 18, and a lawn mowing assembly 20 is carried on the frame near the ground generally between the front and rear wheels. Directional control for the vehicle is provided by a steering wheel 22 coupled to the front wheels 16 by a conventional steering linkage (not shown). A speed control lever 24 and a pedal 25 for controlling vehicle speed are provided on opposite sides of the steering wheel 22. The control lever 24 and the pedal 25 are controllable by an operator for whom a seat 28 is provided generally over the rear wheels 18. The variable speed drive of this invention together with a driving motor (not shown) such as a small gasoline engine are housed within the shell body 12 generally over the front wheels 16. Importantly, while a riding mower is shown in FIG. 1, it should be understood that the variable speed drive of this invention is equally applicable with garden tractors and other small self-propelled vehicles and equipment requiring power transmission over a continuous range of speeds, and using commonly available power driven implements.

The variable speed drive of this invention is shown in detail in FIGs. 2-7. As shown, a driving pulley 30 is mounted for horizontal rotation on the lower end of a vertically extending shaft 32. The shaft 32 extends through the vehicle frame 14, and has its upper end connected to and driven by the driving motor (not shown). The shaft 32 and the driving pulley 30 are thus rotatable by the motor at a rate of speed in accordance with motor speed. Conveniently, motor speed is variable by means of a hand-operated throttle 34 shown adjacent the steering wheel in FIG. 1.

Figure 2:
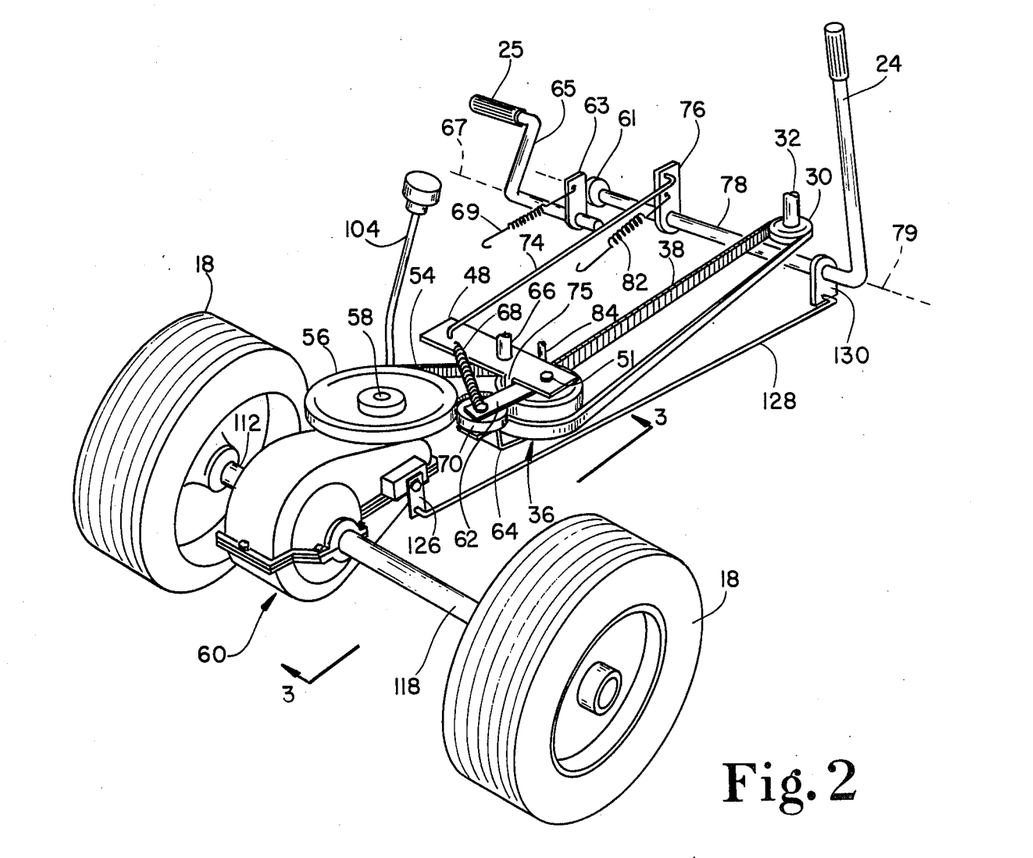
FIG. 2 is a perspective view of the variable speed drive of this invention.
Figure 3:
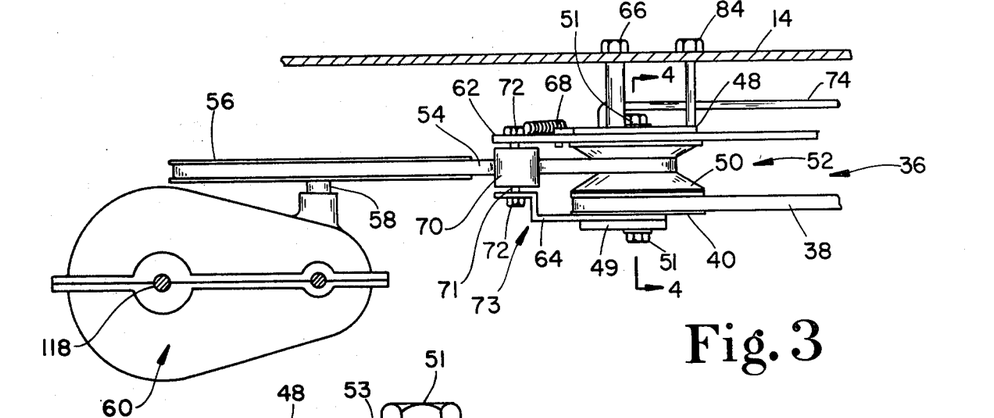
FIG. 3 is an enlarged fragmented vertical section taken on the line 3—3 of FIG. 2.
Figure 4:
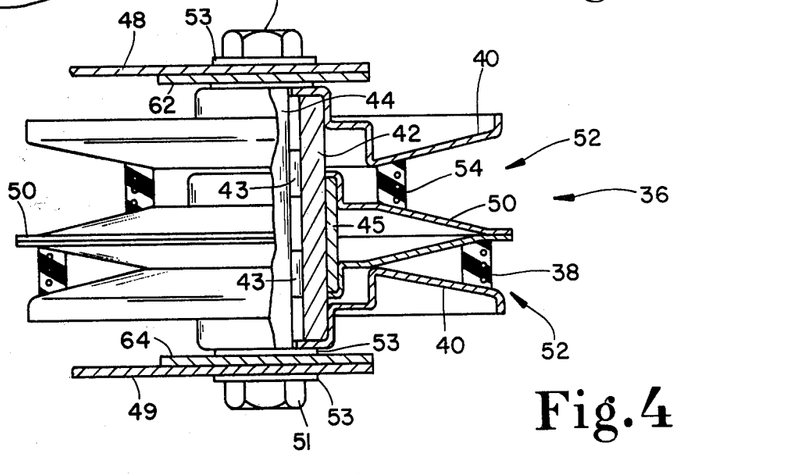
FIG. 4 is an enlarged fragmented vertical section taken on the line 4—4 of FIG. 3.

The driving pulley 30 is coupled to a double pulley, variable speed sheave assembly 36 by a driving belt 38. The driving belt 38 comprises a rubberized continuous V-belt of generally conventional construction, and is reeved about the driving pulley 30 and the sheave assembly 36. The sheave assembly 36 comprises a pair of outer pulley halves 40 fixed in opposed relation on a vertical sleeve 42. The sleeve 42 is rotatably carried by bearings 43 on a vertically extending sheave shaft 44. A central pulley section 50 is carried on a hub 45 which slides axially along the sleeve 42. Thus, the central pulley section 50 combines with the outer pulley halves 40 to form a pair of vertically spaced pulley grooves 52. The driving belt 38 is received in the lower one of these pulley grooves 52 so that rotational motion of the driving pulley 30 is imparted to the sheave assembly 36.

A driven V-belt 54 is reeved about the upper pulley groove 52 of the variable speed sheave assembly 36. This driven belt 54 also comprises a conventional-type continuous belt of rubberized construction, and is reeved about a relatively large driven pulley 56 to couple said pulley 56 to the sheave assembly 36. The driven pulley 56 is horizontally retained on a vertical shaft 58 which imparts rotation of the driven pulley 56 through a transaxle assembly 60 and further to the rear wheels 18 of the vehicle. Thus, rotation of the driving pulley 30 is transmitted through the variable speed sheave assembly 36, the driven pulley 56, and the transaxle assembly 60 to drive the rear wheels 18. Importantly, because the central pulley section 50 slides between the outer pulley halves 40, the two pulley grooves 52 of the sheave assembly 36 have inversely proportional effective diameters. As the central section 50 moves away from the lower outer pulley half 40, the effective diameter of the belt-receiving lower groove 52 decreases to thereby increase the effective diameter of the upper groove 52, and vice versa upon upward motion of the central section 50, to control the sheave assembly drive ratio.

The sheave assembly 36 is mounted for rotation on upper and lower pivot arms 48 and 49. More specifically, the two pivot arms are interconnected and vertically spaced from each other by a vertically extending pin 66. The pin 66 extends upwardly through the upper pivot arm 48 and is in turn pivotally connected to the vehicle frame 14. The two pivot arms 48 and 49 extend horizontally in parallel from the pivot pin 66 generally toward the right side of the vehicle, as viewed in FIG. 2. The pivot arms 48 and 49 include vertically aligned openings for receiving the upper and lower ends of the sheave shaft 44 of the sheave assembly. The upper and lower ends of said shaft 44 extend through the aligned openings 40, and are fixed with respect to the pivot arms by volts 51 and washers 53.

The upper pivot arm 48 also extends from the pivot pin 66 generally toward the left side of the vehicle as viewed in FIG. 2. The left end of the pivot arm 48 is connected to a mechanical control linkage for pivoting the pivot arm 48 and 49 about the pivot pin 66, and thereby shifting the position of the sheave assembly 36 with respect to the driving and driven pulleys 30 and 56. The control linkage comprises a link 74 having its rear end pivotally connected to the left end of the pivot arm 48. The control link 74 extends forwardly from the arm 48, and has its front end pivotally connected to the upper end of a crank arm 76. The lower end of the crank arm 76 is fixed to the lower end of a horizontally extending control shaft 78 mounted on the frame of the vehicle in a suitable manner (not shown) for rotation about the horizontal axis shown by the dotted line 79 in FIG. 2. The right hand end of the control shaft 78 is turned upwardly to form the speed control lever 24 operable by the vehicle operator. Accordingly, when the vehicle operator pushes forwardly and downwardly on the control lever 24, the control link 74 is pulled forwardly to pivot the pivot arms 48 and 49 clockwise as viewed in FIG. 2 about the pivot pin 66 to shift the position of the sheave assembly 36 with respect to the driving and driven pulleys 30 and 56. Importantly, the upper end of the crank arm 76 is coupled to the frame (not shown) by a tension-loaded spring 82 which urges the control link 74 rearwardly. In this manner, the control lever 24, control link 74, pivot arms 48 and 49, and the sheave assembly 36 are always returned to the same initial position whenever the lever 24 is released by the vehicle operator.

A friction collar 61 is fixed on the control shaft 78 generally opposite the control lever 24. Thus, as the control lever is moved by the vehicle operator, the friction collar 61 rotates with the shaft 78. A friction arm 63 is fixed on the lower, inside end of a rockshaft 65 adjacent the friction collar 61. The rockshaft 65 is mounted on the vehicle frame (not shown) for rotation about the horizontal axis shown by the dotted line 67 in FIG. 2, and the upper outer end of the rockshaft 65 comprises the foot pedal 25. The pedal 25 is movable by the vehicle operator to move and hold the friction arm 63 into binding engagement with the friction collar 61. In this manner, the speed control lever 24 is usable to shift the sheave assembly 36 to the desired position, and the foot pedal 25 is effective to hold the control shaft 78 against rotation to correspondingly hold the sheave assembly 36 in the desired position. Conveniently, the friction arm 63 is biased away from the friction collar 61 by a spring 69 connected to the vehicle frame (not shown) so that the sheave assembly 36 returns to its initial position whenever pressure on the foot pedal 25 is released by the operator. Alternately, various other foot pedal and/or hand lever arrangements may be used for controlling the position of the sheave assembly.

A spring lever assembly is mounted on the pivot arms 48 and 49 for controlling the tension of the driving and driven belts 38 and 54. The spring lever assembly comprises a pair of idler arms 62 and 64 carried on the sheave shaft 44. More specifically, an upper idler arm 62 is received over the upper end of the sheave shaft 44 between the pivot arm 48 and the upper pulley half 40. A lower idler arm 64 is similarly received over the lower end of the sheave shaft 44 between the pivot arm 49 and the lower pulley half 40. The two idler arms 62 and 64 extend generally rearwardly from the sheave assembly 36 and are pivotally movable with respect to the sheave assembly. An idler pulley 70 is rotatably carried on a vertical shaft 71 which is secured at its upper and lower ends to the idler arms 62 and 64 by bolts 72.

The idler pulley 70 is disposed generally between the driven pulley 56 and the sheave assembly 36 adjacent the driven belt 54. In this regard, the lower idler arm 64 is generally Z-shaped, as at 73, as shown in FIG. 3 so that the idler pulley 70 is carried in a plane common to the driven belt 54. An idler spring 68 is connected under tension between the idler arm 62 above the idler pulley 70 and the pivot arm 48 adjacent the control link 74. Thus, the idler spring 68 urges the idler arms 62 and 64 to swing toward the driven belt 54 to engage the driven belt with a force equalling the product of the distance the spring 68 is stretched times the spring constant. When the driven belt 54 is placed under driving tension, the central pulley section 50 of the sheave assembly 36 is caused to shift in a manner such that the driving belt 38 is placed under an equal driving tension.

Figure 5:
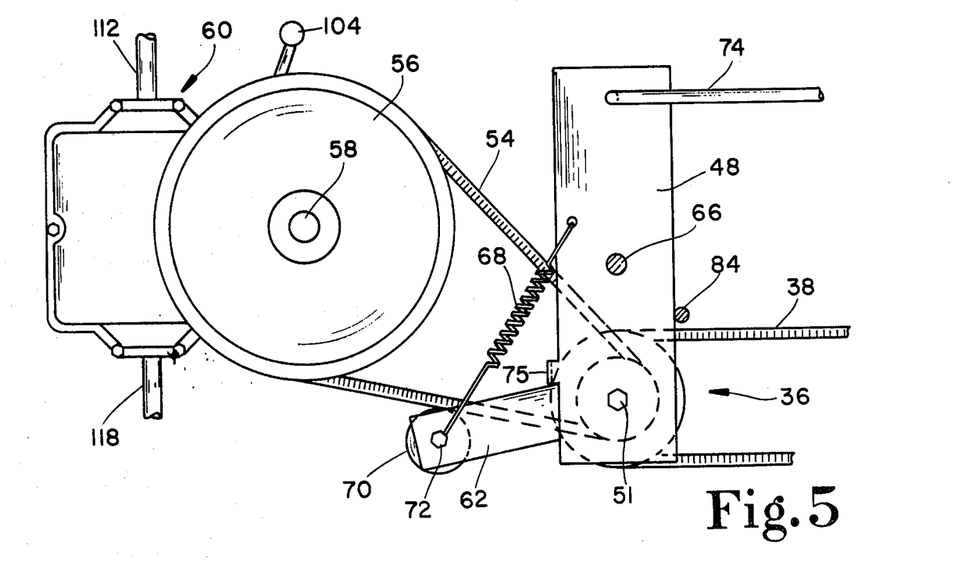
FIG. 5 is a fragmented top plan view showing the variable speed drive in a stopped position.
Figure 6:
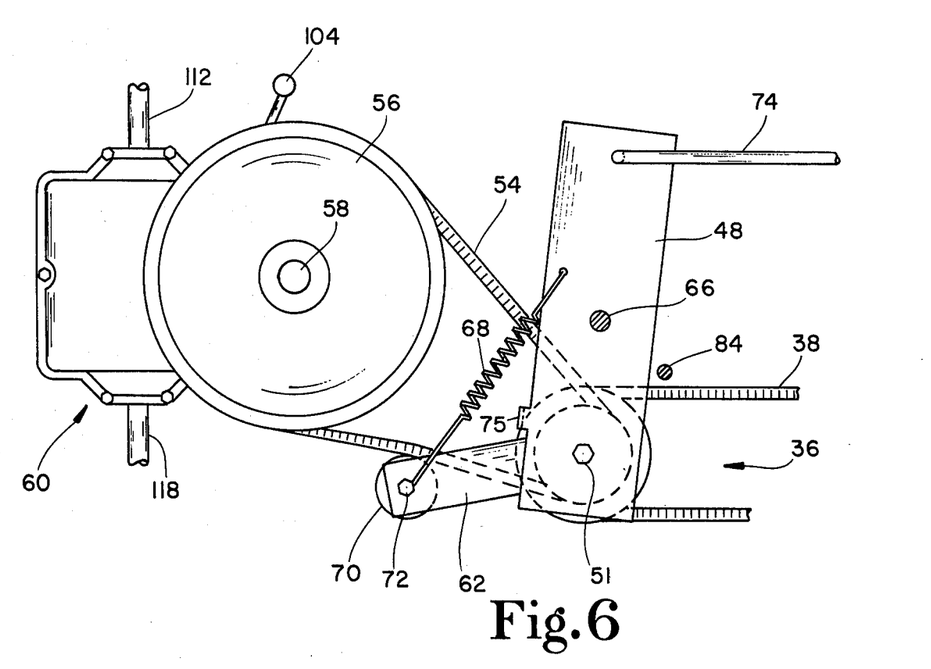
FIG. 6 is a fragmented top plan view showing the drive in a low speed operating position.
Figure 7:
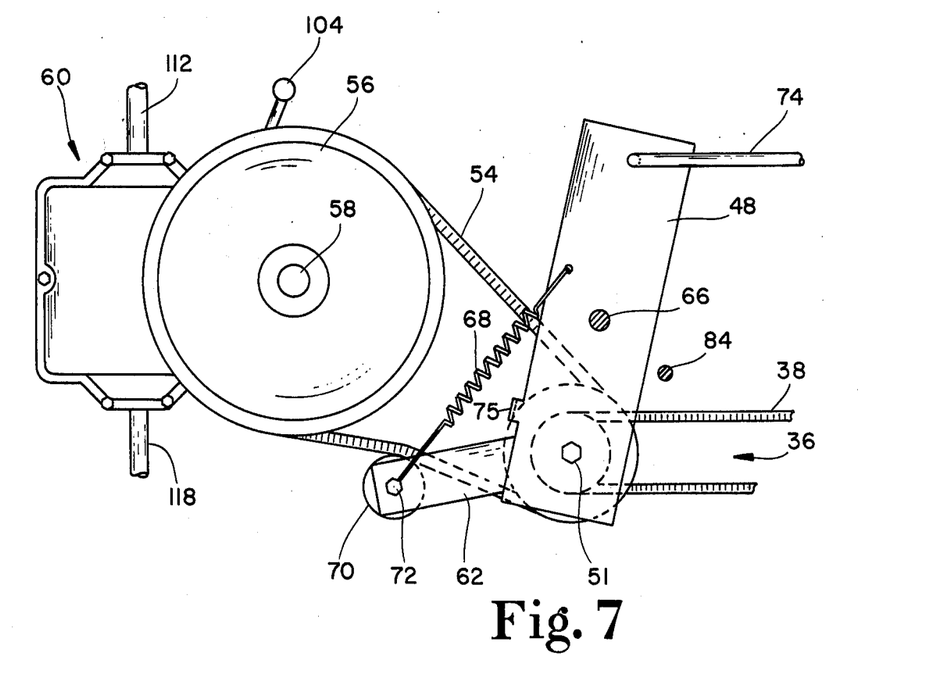
FIG. 7 is a fragmented top plan view showing the drive in a high speed operating position.

Operation of the variable speed drive of this invention is shown in FIGS. 5–7. As shown in FIG. 5, when the speed control lever 24 and the foot pedal 25 are released by the vehicle operator, the control link 74 is urged rearwardly by the spring 82. This pivots the pivot arms 48 and 49 counterclockwise about the pivot pin 66 to a position abutting a stop pin 84 depending from the vehicle frame. In this position, the sheave assembly is disposed relatively near the axial centers of the driving and driven pulleys 30 and 56 so that both of the V-belts 38 and 54 are drivingly disengaged from the sheave assembly and their respective pulley. Also, the idler spring 68 urges the idler pulley 70 toward the driven belt 54. However, a finger 75 depending from the side of the upper pivot arm 48 engages the upper idler arm 62 to keep the idler pulley 70 out of engagement with the belt 54. Thus, the drive system is in a double declutched stopped configuration.

As the control lever 24 is moved forwardly by the vehicle operator, the sheave assembly 36 is shifted clockwise about the pivot pin 66 to a low speed operating position as viewed in FIG. 6. More specifically, movement of the control lever 24 overcomes the force of the crank link spring 82 and pulls the control link 74 forwardly. This pivots the pivot arm 48 about the pivot pin 66 to carry the sheave assembly 36 generally away from the axial centers of the driving and driven pulleys 30 and 56. Such movement carries the idler pulley 70 into contact with the driven belt 54 so that the idler spring 68 stretches and the idler arm 48 pulls away from contact with the stop finger 75. In this manner, the belts 38 and 54 are smoothly and substantially simultaneously placed under driving tension, with the magnitude of driving tension being directly related to the force applied by the idler spring 68. Moreover, the action of the idler spring 68 serves to account for belt stretching during use. In this configuration the sheave assembly 36 is disposed relatively near the driving pulley 30 and relatively far from the driven pulley 56 to place the sheave assembly in a low speed drive ratio. The foot pedal 25 is usable to maintain the sheave assembly in the low speed operating condition without requiring manual holding of the control lever 24, and the crank arm spring 82 provides a dead man control by urging the entire assembly back to the stopped position of FIG. 5 whenever pressure on the foot pedal 25 and the control lever 24 is released.

As the control lever 24 is further depressed by the vehicle operator, the sheave assembly 36 is moved toward a high speed operating condition as viewed in FIG. 7. More specifically, the pivot arm 48 pivots further with respect to the pivot pin 66. The sheave assembly 36 is thereby carried generally away from the axial center of the driving pulley 30 and generally toward the axial center of the driven pulley 56 to shift the sheave assembly toward a high speed drive ratio with both V-belts drivingly engaged. Again, the V-belts are maintained under driving tension by the idler pulley 70 and the idler spring 68. Importantly, as the sheave assembly is moved toward the high speed operating condition, the left hand end of the pivot arm 48 is pulled away from the idler pulley 70. This results in a progressive stretching of the idler spring 68 as sheave assembly operating speed increases such that the tension applied to the V-belts correspondingly increases. This variance of belt tension in accordance with operating speed matches the high speed, high horsepower and low speed, low horsepower design requirements for optimum belt life in modern riding mower vehicles. As pressure on the control lever 24 and the foot pedal 25 is released, the crank arm spring 82 provides a dead man control by urging the entire assembly toward the low speed operating position of FIG. 6 and then to the stopped position of FIG. 5.

Figure 8:
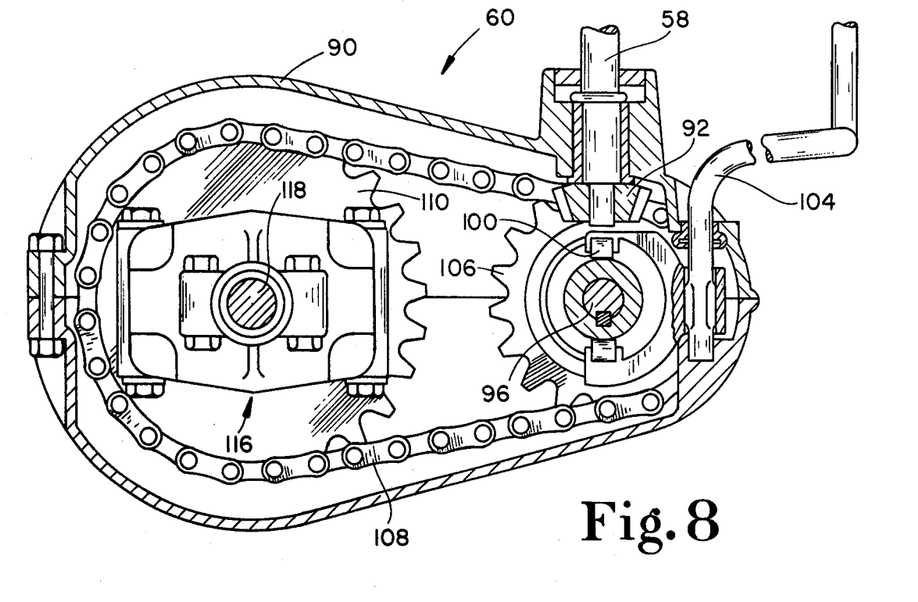
FIG. 8 is an enlarged vertical section of a transaxle assembly for use with the variable speed drive of this invention.
Figure 9:
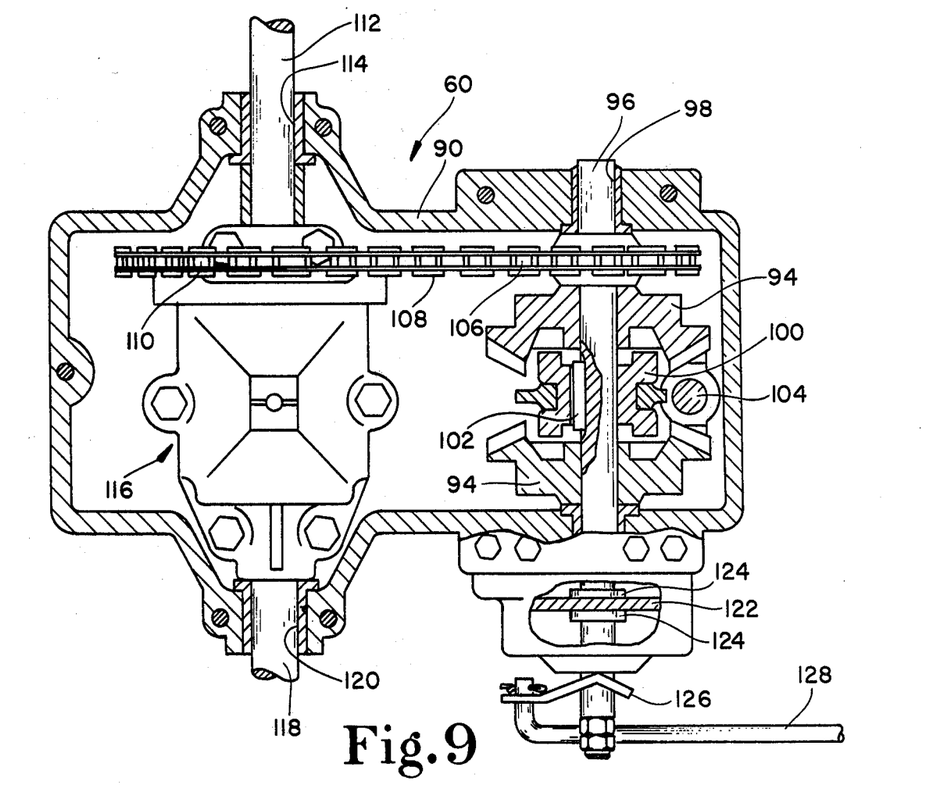
FIG. 9 is a horizontal section of the transaxle assembly of FIG. 8.

The transaxle assembly 60 is shown in detail in FIGS. 8 and 9. As shown, the shaft 58 carrying the driven pulley 56 comprises an input shaft for the transaxle assembly, and has its lower end coupled within an enclosed transaxle housing 90 to a horizontally disposed input bevel gear 92. This input bevel gear 92 is in constant mesh with a pair of facing side bevel gears 94 carried on a horizontal shaft 96, and thus drives the gears 94 in opposite rotational directions. The two side bevel gears 94 are freely rotatable on the shaft 96 which in turn rotates within bearings 98 mounted on the transaxle housing 90. A driving dog 100 is carried on the transaxle shaft 96 between the side bevel gears 94. The driving dog 100 is positioned on the shaft 96 by a key 102 for axial sliding movement along the shaft and for rotation with the shaft. The driving dog is moved along the shaft 96 by a shift lever 104 extending upwardly from the transaxle assembly 60 to engage the dog with one of the two side bevel gears 94. In this manner, the transaxle shaft 96 is caused to rotate within its bearings 98 in a selected one of two rotational directions for either forward or reverse transmission of power.

A sprocket wheel 106 is also keyed on the transaxle shaft 96 for rotation therewith. The sprocket wheel 106 is connected by a driving chain 108 carried within the transaxle housing 90 to a rear sprocket wheel 110 coupled to a differential assembly 116, which is also mounted within the transaxle housing 90. The rear sprocket wheel 110 is coupled through the differential assembly by conventional differential gearing (not shown) to a pair of rear axles 112 and 118 for the vehicle which are respectively carried in bearings 114 and 120. Each of the rear axles 112 and 118 is connected to one of the rear wheels 18 such that rotational motion is coupled through the sprocket wheel 110 and differential assembly 116 to the vehicle rear wheels 18. In this manner, when the driving dog 100 is situated for engagement with one of the side bevel gears 94 for driving of the transaxle shaft 96, the rear axles 112 and 118 are driven in the same rotational directions to drive the rear wheels 18 of the vehicle. Accordingly, forward or reverse driving speeds are available throughout the range of drive ratios of the variable speed sheave assembly 36.

Brake apparatus is also provided for the vehicle, and is shown in FIGS. 2 and 9. As shown, a braking disk 122 is fixed on the transaxle shaft 96 for rotation therewith. The brake disk 122 is disposed between a pair of self-releasing brake pads 124 which are operated by a brake arm 126, all in a well-known manner. The brake arm 126 is connected to one end of a forwardly extending brake link 128, which has its other end connected to a crank arm 130 mounted on the control shaft 78 at the front of the vehicle. Thus, the brake apparatus is controlled by the vehicle operator upon movement of the control lever 24 and the foot pedal 25. When the control lever 24 is pushed forwardly, the brake linke 128 is moved rearwardly to turn the brake arm 126 and release the brake pads 124 from the brake disk 122. Conversely, when the control lever 24 and the foot pedal 25 are moved to their initial positions to place the sheave assembly in a stopped condition, the brake link 128 moves forwardly to turn the brake arm 126 to cause the brake pads 124 to engage the brake disk 122 and stop the vehicle.

I claim:

1. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; first means carrying said sheave assembly and including means for shifting the position of said sheave assembly with respect to said driving and driven pulleys for altering the drive ratio of said sheave assembly through a range of low to high speed operating positions; and second means including an idler pulley for engaging one of said belts, means for movably mounting said idler pulley to said first means, and means for yieldably urging said idler pulley into engagement with said one of said belts.

2. A variable speed drive as set forth in claim 1 wherein said first means comprises a pivot arm movably mounted with respect to said frame and carrying said sheave assembly, and a control linkage connected to said pivot arm and manually operable for moving said pivot arm with respect to said frame for shifting the position of said sheave assembly with respect to said driving and driven pulleys.

3. A variable speed drive as set forth in claim 2 wherein said means for yieldably urging said idler pulley into engagement with said one of said belts includes an idler spring coupled to said idler pulley for urging said idler pulley into engagement with said one belt with a spring force variable according to operating speed.

4. A variable speed drive as set forth in claim 3 wherein said means for movably coupling said idler pulley to said first means comprises an idler arm carrying said idler pulley and pivotally mounted on said pivot arm.

5. A variable speed drive as set forth in claim 4 wherein said idler spring is connected between said idler arm and said pivot arm at points displaced from the pivotal mounting between said idler arm and said pivot arm.

6. A variable speed drive as set forth in claim 5 wherein said pivot arm is movable to shift said sheave assembly between a stopped position and said range of low to high speed operating positions, and including means for maintaining said idler pulley away from engagement with said one of said belts when said sheave assembly is in said stopped position.

7. A variable speed drive as set forth in claim 6 wherein said means for maintaining said idler pulley away from engaging said one of said belts comprises a finger on said pivot arm for engaging said idler arm.

8. A variable speed drive as set forth in claim 2 wherein said control linkage comprises a control link pivotally connected to said pivot arm, a crank arm connected to said control link opposite said pivot arm, a control shaft mounted on said frame and connected to said crank arm, and means for controllably rotating said control shaft about a fixed axis with respect to said frame for shifting the position of said pivot arm with respect to said frame.

9. A variable speed drive as set forth in claim 8 including means for holding said control shaft in a selected position of rotation.

10. A variable speed drive as set forth in claim 9 wherein said holding means comprises a friction arm mounted on said frame and movable into frictional engagement with said control shaft.

11. A variable speed drive as set forth in claim 10 including a friction collar mounted on said control shaft, said friction arm being movable into frictional engagement with said collar.

12. A variable speed drive as set forth in claim 2 wherein said pivot arm is movable to shift said sheave assembly between a stopped position and said range of low to high speed operating positions, and including dead man control means for biasing said sheave assembly toward said stopped position.

13. A variable speed drive as set forth in claim 12 wherein said dead man control means comprises a spring.

14. A variable speed drive as set forth in claim 12 wherein said dead man control means is connected to said control linkage.

15. A variable speed drive as set forth in claim 1 wherein said second means comprises an idler pulley, means for movably mounting said idler pulley for engaging one of said first and second belts, and an idler spring coupled to said idler pulley for urging said idler pulley into engagement with said one belt with a spring force variable according to operating speed.

16. A variable speed drive as set forth in claim 15 wherein said mounting means comprises an idler arm carrying said idler pulley and pivotally mounted on said first means.

17. A variable speed pulley as set forth in claim 16 wherein said first means is movable to shift said sheave assembly between a stopped position and said range of low to high speed operating positions, and including means for maintaining said idler pulley away from engagement with said one of said belts when said sheave assembly is in said stopped position.

18. A variable speed drive as set forth in claim 1 including a transaxle assembly mounted on said frame and connected to at least one axle, said driven pulley being connected to said transaxle assembly to impart rotational motion of said driven pulley to said one axle.

19. A variable speed drive as set forth in claim 18 including brake means coupled to said transaxle assembly for braking rotational motion of said one axle.

20. A variable speed drive as set forth in claim 17 wherein said first means is movable to shift said sheave assembly between a stopped position and said range of low to high speed operating positions, and including means coupled between said first means and said brake means for actuating said brake means when said sheave assembly is in said stopped position.

21. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; a pivot arm movably mounted with respect to said frame and carrying said sheave assembly; a control linkage pivotally connected to said pivot arm for moving said pivot arm with respect to said frame to shift the position of said sheave assembly with respect to said driving and driven pulleys to alter the drive ratio of the sheave assembly between a stopped position and a range of low to high speed operating positions; means including an idler pulley, means for movably connecting the idler pulley to the pivot arm and means for yieldably urging the idler pulley to a predetermined position with respect to the pivot arm for controllably maintaining said first and second belts under driving tension variable in accordance with variations in operating speed, and means for preventing tensioning of said first and second belts when said sheave assembly is in said stopped position.

22. A variable speed drive as set forth in claim 21 including dead man control means for biasing said sheave assembly toward said stopped position.

23. A variable speed drive as set forth in claim 21 wherein said means comprises an idler arm carrying said idler pulley and pivotally mounted on said pivot arm, and the yieldable urging means includes an idler spring connected between said idler arm and said pivot arm at points displaced from the pivotal mounting between said idler arm and said pivot arm.

24. A variable speed drive as set forth in claim 23 wherein said means for preventing tensioning of said belts comprises a finger on said pivot arm for engaging said idler arm.

25. A variable speed drive as set forth in claim 21 wherein said control linkage includes means for holding said sheave assembly in a selected position with respect to said driving and driven pulleys.

26. A variable speed drive having a frame with a driving pulley, a driven pulley, and a double pulley variable speed sheave assembly respectively rotatably positioned with respect thereto, first and second belts respectively reeved about said driving pulley and sheave assembly and said driven pulley and sheave assembly, and means for movably carrying said sheave assembly and for shifting the position of said sheave assembly with respect to said driving and driven pulleys for altering the drive ratio of said sheave assembly through a range of low to high speed operating positions, an idler pulley, means for movably mounting said idler pulley from said means for movably carrying said sheave assembly for engaging one of said first and second belts, and an idler spring connected to said idler pulley for urging said idler pulley into engagement with said one of said belts with a spring force variable according to operating speed.

27. A variable speed drive as set forth in claim 26 wherein said carrying and shifting means is movable for shifting said sheave assembly between a stopped position and said range of low to high speed positions, and including means for preventing engagement of said idler pulley with said one of said belts when said sheave assembly is in said stopped position.

28. A variable speed drive as set forth in claim 27 wherein said carrying and shifting means comprises a pivot arm carrying said sheave assembly, said idler arm being pivotally connected to said pivot arm and said idler spring being connected between said idler arm and said pivot arm.

29. A variable speed drive as set forth in claim 28 wherein said preventing means comprises a finger on said pivot arm for engaging said idler arm.

30. A variable speed drive comprising a frame; a driving pulley and a driven pulley each rotatably mounted with respect to said frame; a double pulley variable speed sheave assembly; a first belt reeved about said driving pulley and sheave assembly; a second belt reeved about said driven pulley and sheave assembly; means for carrying said sheave assembly and for shifting the position of said sheave assembly with respect to said driving and driven pulleys for altering the drive ratio of said sheave assembly between a stopped position and a range of low to high speed operating positions; dead man control means for biasing said sheave assembly toward said stopped position; an idler pulley, means for movably mounting said idler pulley for engaging one of said first and second belts; an idler spring connected to said idler pulley for urging said idler pulley into engagement with said one of said belts with a spring force variable according to operating speed; and means for preventing engagement of said idler pulley with said one of said belts when said sheave assembly is in said stopped position.

31. A variable speed drive comprising a frame; a driving and driven pulley each rotatably mounted on said frame; a double pulley variable speed sheave assembly; a first belt reeved about said driving pulley and said sheave assembly; a second belt reeved about said driven pulley and said sheave assembly; a pivot arm pivotally mounted on said frame and carrying said sheave assembly; a control linkage for pivotally moving said pivot arm with respect to said frame for shifting the position of said sheave assembly with respect to said driving and driven pulleys to alter the sheave assembly drive ratio through a range of low to high speed operating conditions; an idler arm pivotally mounted on said pivot arm; an idler pulley carried on said idler arm for engaging one of said first and second belts; and an idler spring coupled between said idler arm and said pivot arm for urging said idler pulley into engagement with said one belt with a spring force variable according to operating speed.

32. A variable speed drive as set forth in claim 31 wherein said control linkage is operable for moving said sheave assembly between a stopped position with said first and second belts drivingly disengaged and said range of low to high speed positions, said control linkage including dead man control means for biasing said sheave assembly toward said stopped position.

33. A variable speed drive as set forth in claim 32 including means for preventing said idler pulley from engaging said one of said belts when said sheave assembly is in said stopped position.

* * * * *